(12) United States Patent
Chalasani

(10) Patent No.: US 6,265,108 B1
(45) Date of Patent: Jul. 24, 2001

(54) FLOODED VALVE REGULATED LEAD-ACID BATTERY HAVING IMPROVED LIFE

(76) Inventor: Subhas Chandra Chalasani, 417 Brigade Ct., Plano, TX (US) 75024

( * ) Notice: Subject to any disclaimer, the term of this patent is extended or adjusted under 35 U.S.C. 154(b) by 0 days.

(21) Appl. No.: 09/453,116

(22) Filed: Dec. 2, 1999

(51) Int. Cl.[7] .................................................. H01M 4/56
(52) U.S. Cl. .......................... 429/225; 429/247; 429/248; 429/251; 429/252; 429/129; 429/131; 429/132; 429/133; 429/134; 429/135; 429/163; 429/161
(58) Field of Search ..................................... 429/225, 163, 429/74, 72, 247, 248, 251, 252, 129, 131, 132, 133, 134, 135, 145, 60, 161

(56) References Cited

FOREIGN PATENT DOCUMENTS

| 2831127A | * | 1/1979 | (EP) | ............................... H01M/4/73 |
| 63108667A | * | 5/1988 | (JP) | ............................... H01M/2/28 |

* cited by examiner

Primary Examiner—Gabrielle Brouillette
Assistant Examiner—Angela J. Martin
(74) Attorney, Agent, or Firm—Locke Liddell & Sapp LLP

(57) ABSTRACT

A valve regulated lead-acid battery having a plurality of negative and positive electrode plates, a plurality of separators soaked with electrolyte interleaved between the plates, a negative strap and positive strap interconnecting the respective plurality of negative and positive electrodes includes separator material soaked with electrolyte disposed adjacent to the negative strap to thereby increase oxygen reduction.

19 Claims, 4 Drawing Sheets

FLOODED VALVE REGULATED LEAD-ACID BATTERY HAVING IMPROVED LIFE

TECHNICAL FIELD OF THE INVENTION

The present invention relates to valve regulated lead-acid batteries, and more particularly to a battery having a flooded electrolyte condition with improved battery life.

BACKGROUND OF THE INVENTION

Based on the quantity of acid present in a battery, lead-acid batteries are classified as either flooded or starved electrolyte batteries. In flooded batteries, acid is in excess which is also referred to as free acid. Whereas, in starved electrolyte batteries there is no excess or free acid. Starved batteries are designed such that all the acid in the battery is immobilized in the plates and in either the separators or in gel form. Where the acid is immobilized in the separators, the battery is referred to as an absorbed glass matrix (AGM) battery. Where the acid is immobilized in the gel form, the battery is referred to as a gel type battery.

A valve regulated lead-acid (VRLA) battery is a starved electrolyte AGM type battery and has a safety valve which prevents excessive build up of gas pressure inside the battery. A key for the successful operation of a VRLA battery is the oxygen recombination reaction which prevents the water loss from a battery by recombining the oxygen and by suppressing hydrogen gas liberation at the negative electrode. The starved acid design of the battery facilitates the oxygen recombination reaction. The recombination reactions are facilitated by the starved acid or electrolyte condition where the electrolyte is immobilized in glass separators disposed between the plates of the battery.

VRLA batteries have numerous advantages over their counterpart flooded batteries, such as, for example, low maintenance, ease of handling, and high power density. However, deficiencies in VRLA batteries include: a) recombination reactions tend to generate excessive heat and accelerate thermal runaway processes; b) under uncontrolled environments, VRLA batteries dry out since the batteries have a limited amount of electrolyte; c) low heat dissipation; and d) self discharge of the negative electrode leads to premature capacity loss and battery failure. These deficiencies are unique to VRLA batteries.

A need has thus arisen for an improved VRLA battery designed for longer life.

SUMMARY OF THE INVENTION

In accordance with the present invention, a valve regulated lead-acid battery having a plurality of negative and positive electrode plates and a plurality of separators interleave between the plates is provided. A negative strap and positive strap interconnect the respective plurality of negative and positive electrodes. Material soaked with electrolyte is disposed adjacent to the negative strap to thereby increase oxygen reduction.

In accordance with the present invention, a VRLA battery has electrolyte in a flooded state, the electrodes and the separators being fully submerged in the electrolyte. This condition disturbs the "starved" state and minimizes the oxygen recombination reaction. In order for oxygen recombination to occur, the negative strap is wrapped with separator material which is in contact with electrolyte, to constantly moisten the separator material to facilitate the oxygen recombination reaction.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
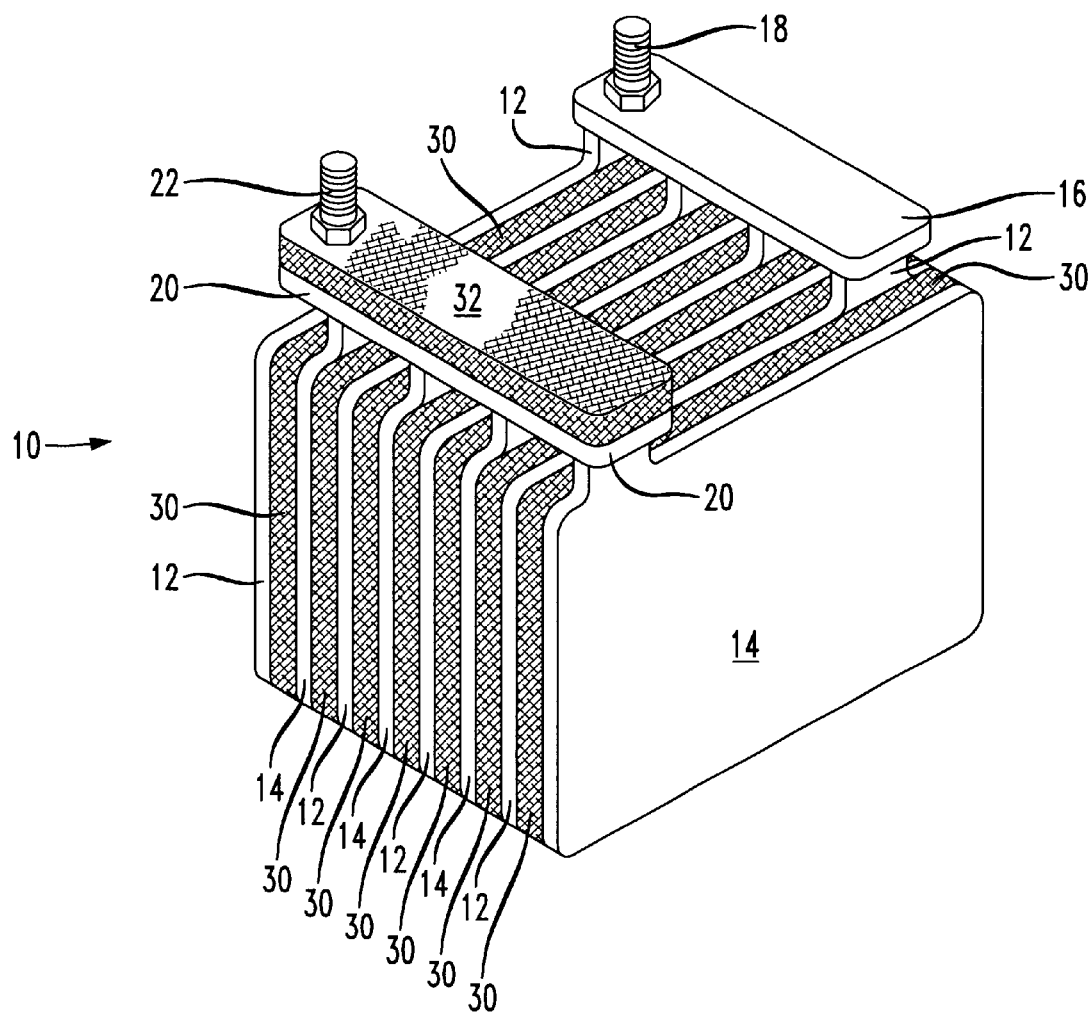
FIG. 1 is a schematic diagram illustrating a cell of a valve regulated lead-acid battery in accordance with the present invention.

Referring to FIG. 1, a cell 10 of a valve regulated lead-acid battery is shown having a stack of electrodes including a plurality of positive electrode plates 12 and a plurality of negative electrode plates 14. One cell 10 is illustrated in FIG. 1, it being understood that a valve regulated lead-acid battery includes a plurality of such cells 10. Positive electrode plates 12 are interconnected via a link or strap 16 to a terminal 18 of cell 10. Negative electrode plates 14 are connected via a link or strap 20 to a terminal 22 of cell 10.

Interleaved between plates 12 and 14 are a plurality of separators 30. Separators 30 are soaked with electrolyte, and are composed of, for example, glass material including glass wool or felted glass fibers where the electrolyte is immobilized as in an absorbed glass matrix (AGM) battery. Additionally, electrolyte may be immobilized in a gel form as in a gel type battery.

In accordance with the present invention, an additional layer of separator material 32 is disposed on the top surface of strap 20 to thereby increase the surface area where oxygen reduction occurs within cell 10. Separator material 32 is soaked with electrolyte. A thin layer of electrolyte is therefor in contact with strap 20 thereby increasing the rate under which oxygen reduction occurs. In cell 10, all electrode plates 12 and 14 and separators 30 are fully submerged in electrolyte. Separator material 32 is in contact with the electrolyte in cell 10, such that separator material 32 is always moistened with electrolyte.

Figure 2:
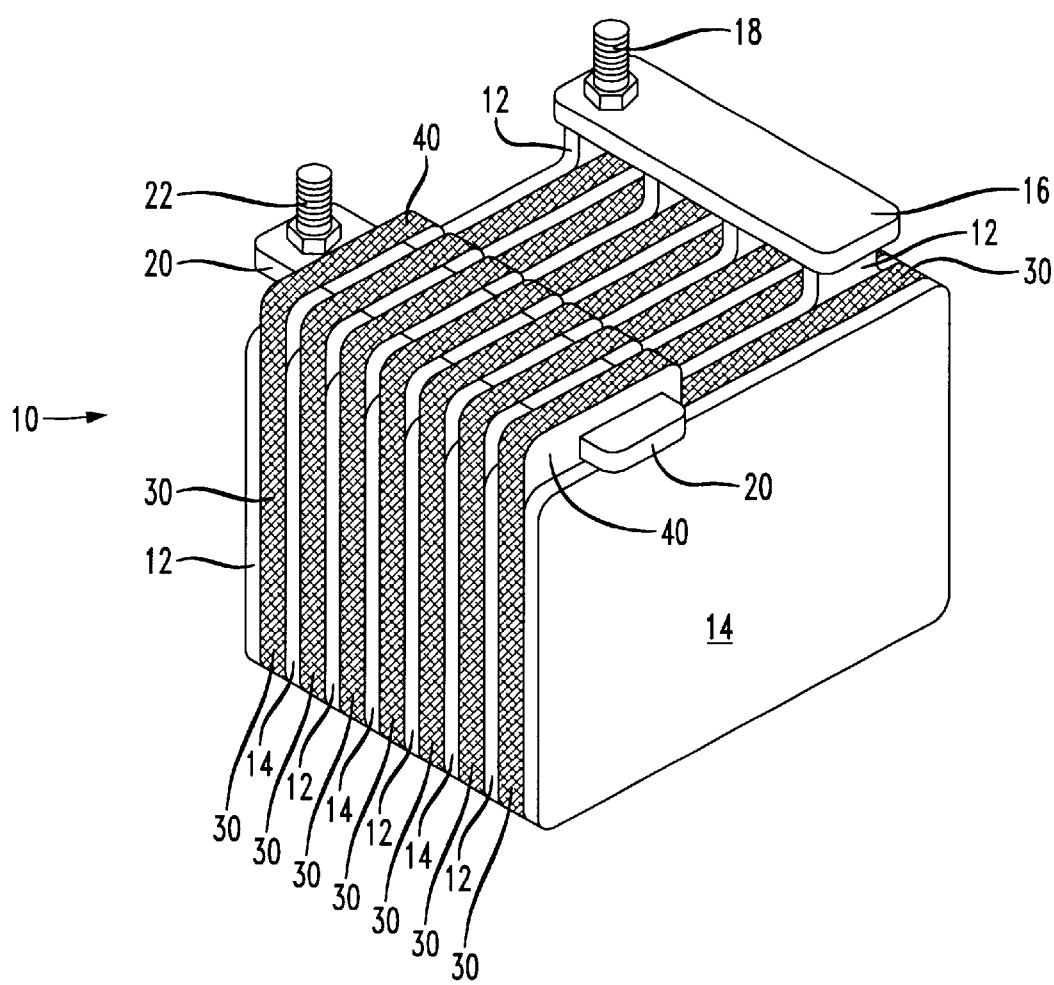
FIGS. 2–4 are schematic diagrams illustrating alternate embodiments of a cell of a valve regulated lead-acid battery in accordance with the present invention.

Referring now to FIG. 2, an additional embodiment of the present invention is illustrated. Separators 30 include a loop extension 40 extending from the top edge of separators 30, such that strap 20 is inserted within loop extensions 40. Loop extensions 40 surround strap 20 and are soaked with electrolyte thereby providing an additional source of electrolyte in the area around strap 20.

Figure 3:
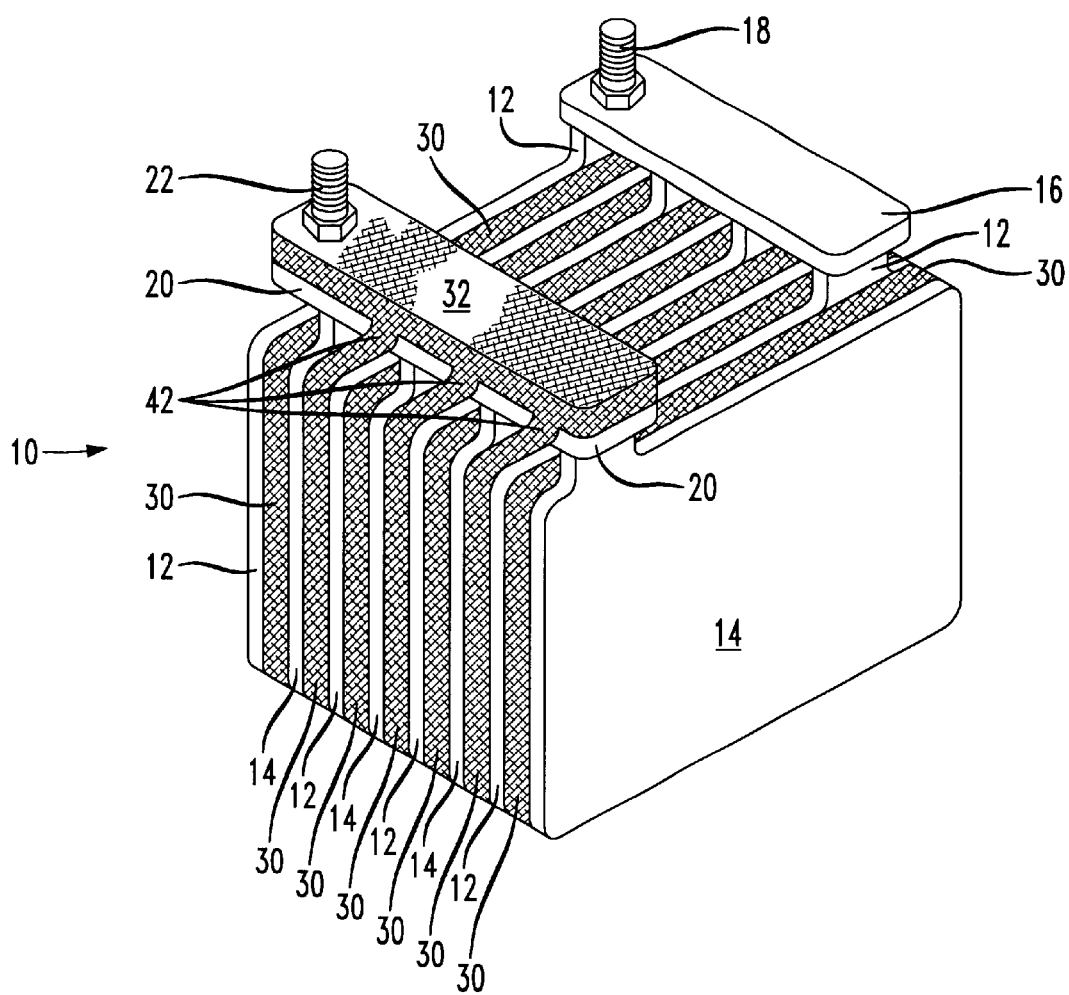

FIG. 3 illustrates an additional embodiment of the present invention in which separator material 32 is connected to separators 30 via strips 42. Strips 42 function to wick electrolyte from separators 30 to material 32, so that separator material 32 is maintained moist with electrolyte.

Figure 4:
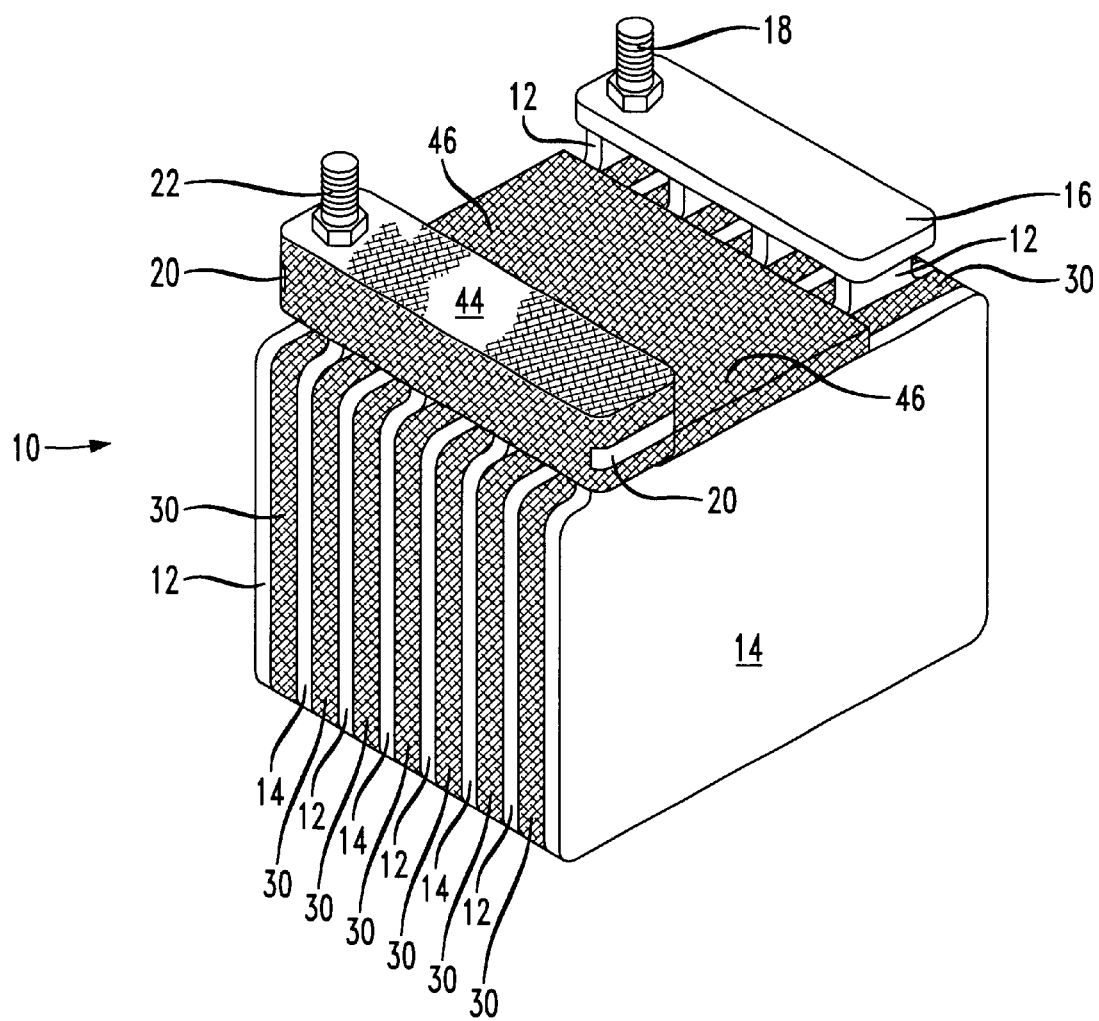

FIG. 4 illustrates a further embodiment of the present invention in which a sleeve 44 wraps around strap 20 and includes an extension 46, which extends into cell 10 and is in contact with electrolyte to provide electrolyte in the area of strap 20.

It therefore can be seen that the present invention provides for an improved valve regulated lead-acid battery, resulting in extended battery life by having excess electrolyte and without giving up the oxygen reduction reaction.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. In a flooded valve regulated lead-acid battery including a plurality of positive and negative electrode plates, each of the plurality of positive electrode plates being interconnected by a strap, and each of the plurality of negative electrode plates being interconnected by a strap, the strap interconnecting the negative electrode plates being disposed substantially perpendicular to the negative electrode plates and having spaced apart top and bottom surfaces, and a plurality of separators disposed between the plurality of positive and negative plates for retaining an electrolyte, the improvement comprising:

electrolyte absorbent material containing electrolyte disposed adjacent to and contacting said top surface of said strap interconnecting the negative electrode plates.

2. The valve regulated lead-acid battery of claim 1 wherein the separators retain electrolyte in an absorbed glass matrix.

3. The valve regulated lead-acid battery of claim 1 wherein the separators retain electrolyte in gel form.

4. A valve regulated lead-acid battery comprising:

a plurality of negative electrode plates;

a plurality of positive electrode plates;

a plurality of separators interleaved between said plurality of plates and being soaked with electrolyte;

a negative strap interconnecting said plurality of negative electrode plates;

a positive strap interconnecting said plurality of positive electrode plates; and material soaked with electrolyte disposed adjacent to and contacting said negative strap, said material includes a plurality of loops extending from said separators interleaved between said plates.

5. The battery of claim 4 wherein said material includes a layer of felted glass fibers.

6. The battery of claim 4 wherein said material includes portions of said separators interleaved between said plates.

7. The battery of claim 4 wherein said separators include felted glass fibers.

8. A valve regulated lead-acid battery comprising:

a plurality of negative electrode plates;

a plurality of positive electrode plates;

a plurality of separators interleaved between said plurality of plates and being soaked with electrolyte;

a negative strap interconnecting said plurality of negative electrode plates;

a positive strap interconnecting said plurality of positive electrode plates; and a glass separator material soaked with electrolyte disposed adjacent to and contacting said negative strap, said glass separator material includes a plurality of loops surrounding said negative strap and extending from said separators interleaved between said plates.

9. The battery of claim 8 wherein said glass separator material includes felted glass fibers.

10. The battery of claim 8 wherein said separators include felted glass fibers.

11. The battery of claim 8 wherein said separators include electrolyte in gel form.

12. A valve regulated lead-acid battery comprising:

a plurality of negative electrode plates;

a plurality of positive electrode plates;

a plurality of separators interleaved between said plurality of plates and being soaked with electrolyte;

a negative strap interconnecting said plurality of negative electrode plates;

a positive strap interconnecting said plurality of positive electrode plates; and a glass separator material soaked with electrolyte disposed adjacent to and contacting said negative strap said glass separator material includes a plurality of strips contacting one of said separators.

13. The battery of claim 12 wherein said glass separator material includes felted glass fibers.

14. The battery of claim 12 wherein said separators include felted glass fibers.

15. The battery of claim 12 wherein said separators include electrolyte in gel form.

16. A valve regulated lead-acid battery comprising:

a plurality of negative electrode plates;

a plurality of positive electrode plates;

a plurality of separators interleaved between said plurality of plates and being soaked with electrolyte;

a negative strap interconnecting said plurality of negative electrode plates;

a positive strap interconnecting said plurality of positive electrode plates; and a glass separator material soaked with electrolyte disposed adjacent to and contacting said negative strap, said glass separator material includes a sleeve contacting said negative strap.

17. The battery of claim 16 wherein said glass separator material includes felted glass fibers.

18. The battery of claim 16 wherein said separates include felted glass fibers.

19. The battery of claim 16 wherein said separators include electrolyte in gel form.

* * * * *

UNITED STATES PATENT AND TRADEMARK OFFICE
CERTIFICATE OF CORRECTION

PATENT NO.   : 6,265,108 B1
DATED        : July 24, 2001
INVENTOR(S)  : Subhas Chandra Chalasani It is certified that error appears in the above-identified patent and that said Letters Patent is hereby corrected as shown below:

<u>Column 4,</u>
Line 24, following "strips" insert -- each --.

Signed and Sealed this

Ninth Day of April, 2002

Attest:

Attesting Officer

JAMES E. ROGAN
*Director of the United States Patent and Trademark Office*